US 11,009,888 B2

(12) United States Patent
Steder et al.

(10) Patent No.: US 11,009,888 B2
(45) Date of Patent: May 18, 2021

(54) AUTONOMOUS VEHICLE AND MARKING ARRANGEMENT FOR AN AUTONOMOUS VEHICLE (71) Applicant: SICK AG, Waldkirch/Breisgau (DE)

(72) Inventors: Bastian Steder, Au (DE); Fabian Fischer, Waldkirch (DE); Thomas Bludau, Denzlingen (DE)

(73) Assignee: SICK AG, Waldkirch (DE)

( * ) Notice: Subject to any disclaimer, the term of this patent is extended or adjusted under 35 U.S.C. 154(b) by 163 days.

(21) Appl. No.: 16/130,333

(22) Filed: Sep. 13, 2018

(65) Prior Publication Data

US 2019/0079530 A1 Mar. 14, 2019

(30) Foreign Application Priority Data

Sep. 14, 2017 (EP) .................................... 17191122

(51) Int. Cl.
G05D 1/00 (2006.01)
G05D 1/02 (2020.01)
G06K 9/00 (2006.01)

(52) U.S. Cl.
CPC ......... *G05D 1/0234* (2013.01); *G05D 1/0088* (2013.01); *G05D 1/0244* (2013.01);
(Continued)

(58) Field of Classification Search
CPC .. G05D 1/0244; G05D 1/0263; G05D 1/0265; G05D 1/0088; G05D 1/0212;
(Continued)

(56) References Cited

U.S. PATENT DOCUMENTS 4,566,032 A * 1/1986 Hirooka ............... B66F 9/063
180/168
4,716,530 A * 12/1987 Ogawa ................. G05D 1/0234
180/168
(Continued)

FOREIGN PATENT DOCUMENTS

CN 107037810 A 8/2017
EP 0201720 A1 11/1986
(Continued)

OTHER PUBLICATIONS

Kamewaka et. al., "A Magnetic Guidance System for Automated Guided Vehicles", Sep. 1987, IEEE Transactions on Magnetics, vol. Mag-23, No. 5 (Year: 1987).*
(Continued)

*Primary Examiner* — Anshul Sood
(74) *Attorney, Agent, or Firm* — Nath, Goldberg & Meyer; Jerald L. Meyer (57) ABSTRACT

An autonomous vehicle, in particular an automated guided vehicle, comprises a control device and a sensor for detecting a continuous lane marking. The control device is adapted to control the vehicle along the lane marking in dependence on the detected lane marking, wherein the sensor is adapted to detect a code marking arranged adjacent to the lane marking and to determine a distance between the detected code marking and the lane marking, and wherein the control device is further adapted to control the vehicle in dependence on the determined distance.

18 Claims, 2 Drawing Sheets

(52) U.S. Cl.
CPC ....... *G05D 1/0259* (2013.01); *G06K 9/00798* (2013.01); *G05D 2201/0212* (2013.01); *G05D 2201/0213* (2013.01); *G05D 2201/0216* (2013.01)

(58) Field of Classification Search
CPC .. G05D 1/0234; G05D 1/0259; G05D 1/0276; G05D 2201/0212; G05D 2201/0213; G05D 2201/0216; B66F 9/063; G05B 19/41895; B62D 63/02; B62D 63/04; G06K 9/00798
See application file for complete search history.

(56) References Cited

U.S. PATENT DOCUMENTS

| | | | | |
|---|---|---|---|---|
| 5,814,961 | A * | 9/1998 | Imahashi | G05D 1/0234 318/587 |
| 6,341,430 | B1 * | 1/2002 | Carstens | G05D 1/0234 33/563 |
| 9,704,404 | B2 * | 7/2017 | Park | G08G 1/167 |
| 2014/0324325 | A1 * | 10/2014 | Schlensag | B60W 30/18163 701/116 |
| 2015/0057802 | A1 * | 2/2015 | Kroyan | B25J 9/1697 700/259 |
| 2017/0168496 | A1 * | 6/2017 | Yamamoto | G05D 1/0276 |
| 2018/0362038 | A1 * | 12/2018 | Rothmund | B60W 30/12 |
| 2019/0295420 | A1 * | 9/2019 | Fu | G08G 1/167 |

FOREIGN PATENT DOCUMENTS

| | | |
|---|---|---|
| EP | 0290634 A1 | 11/1988 |
| EP | 0374294 A1 | 6/1990 |
| JP | 62026513 A | 2/1987 |
| JP | S63-273111 A | 1/1988 |
| JP | H9-325816 A | 12/1997 |
| JP | 2012-221229 A | 11/2012 |

OTHER PUBLICATIONS

European search report dated Mar. 15, 2018 for corresponding application No. 17191122.5.

Beccari G et al: "Vision-based Line Tracking and Navigation in Structured Environments", Jul. 10, 1997, XP010239728, pp. 406-411.

RoboteQ: "Building a Magnetic Track Guided AGV-AN1326", Nov. 26, 2013, XP055451739, pp. 1-13.

Office Action dated Nov. 20, 2020 issued in corresponding Chinese Application No. 201811067439.0.

* cited by examiner

AUTONOMOUS VEHICLE AND MARKING ARRANGEMENT FOR AN AUTONOMOUS VEHICLE

FIELD

The present invention relates to an autonomous vehicle having a control device and a sensor for detecting a central continuous lane marking, wherein the control device is adapted to control the vehicle along the lane marking in dependence on the detected lane marking. Such autonomous vehicles are generally known and are in particular used as automated guided vehicles in an industrial context, e.g. in storage warehouses and in production halls.

BACKGROUND

The sensor that can be called a lane sensor and the lane marking are technologically matched to one another. The sensor can thus e.g. be an optical sensor that detects a high contrast lane marking in an optical manner so that the vehicle can be controlled along the lane marking on this basis, i.e. the vehicle fully automatically follows the lane marking. The lane marking can be configured for this purpose e.g. as a solid or dashed line that is adhered to the floor along a desired lane. Alternatively to an optical system, the sensor can be an electromagnetic sensor that detects an electromagnetic or magnetic lane marking. A plurality of induction loops that are arranged after one another and that together form a lane marking are also conceivable. The induction loops can be introduced into the floor and can be contactlessly detected or registered by the sensor.

It is frequently necessary to provide further information to the vehicle along the lane in addition to the lane marking that marks a desired lane. This information can, for example, be control information to be able to control the vehicle in a desired manner. Exemplary control information can, for example, be position information so that the vehicle can determine its relative position or its global position. The vehicle can furthermore be advised by the further information that a corner is impending in the further course of the lane and that the normal speed should therefore be reduced. It can furthermore be necessary in the case of a plurality of possible lanes to advise the vehicle which of the plurality of possible lanes should be followed in the further course. In other words the further information can include properties of the lane or route information for the vehicle. Further information is also conceivable that can be relevant to the control of the vehicle in a specific application.

To provide the vehicle with specific information along the lane, it is known to provide further markings adjacent to the lane marking that are detected and interpreted by the vehicle. Such markings can, for example, be provided in the form of magnetic strips. It is necessary in this respect to apply a plurality of markings, that are e.g. arranged behind one another in parallel with the lane marking, in dependence on the complexity of the information and on the resolution of the sensor used. This circumstance involves the vehicle having to cover a corresponding travel distance for the complete detection of the information represented by the markings, i.e. the sectionally detected markings have to be accumulated over time from the point of view of the vehicle. This can, however, in particular result in problems when the vehicle has to be stopped during the detection of the markings for unforeseeable reasons and the information can hereby only be partly detected. For this reason, the vehicle has to be equipped with intelligence so that a reading of information is possible "bit by bit" without disruption. It has, however, been found that this demand can only be satisfied with a high effort and even then only unsatisfactorily since a dynamic or flexible control of the vehicle is ultimately impeded.

It has further been found that in the course of the development of ever more complex autonomous travel systems an ever larger number of different pieces of information have to be provided along the lane. The number of markings required for this—in addition to the lane marking—requires high space requirements. The markings cannot be arranged as close to one another as desired in dependence on the sensors used since the markings can otherwise no longer be distinguished from one another. With a high number of markings, the demands on the corresponding sensors that have to be provided at the vehicle to detect the markings also increases.

U.S. Pat. No. 5,814,961 A discloses an autonomous vehicle having a control device and a sensor for detecting a continuous lane marking. Further technological background is described in U.S. 2017/168,496 A1 and in the documents "Roboteq: Building a Magnetic Track guided AGV—AN1326, Nov. 26, 2013" and in "Beccari et al: Vision-based line tracking and navigation in structured environments, Proceedings of IEEE International Symposium on Computational Intelligence in Robotics and Automation, 1997".

SUMMARY

It is an object of the invention to provide an autonomous vehicle that is able to reliably detect and process complex information on the basis of markings provided in addition to the lane markings in a short time, wherein the vehicle should have low complexity.

It is furthermore an object of the invention to provide a marking arrangement for an autonomous vehicle that takes account of the above-named demands on the autonomous vehicle.

The object is satisfied by an autonomous vehicle and by a marking arrangement in accordance with the respective independent claim.

The invention generally relates to an autonomous vehicle having a control device and a sensor for detecting a continuous lane marking, wherein the control device is adapted to control the vehicle along the lane marking in dependence on the detected lane marking. The sensor is here adapted to detect a code marking arranged adjacent to the lane marking and to determine a distance between the detected code marking and the lane marking, with the control device further being adapted to control the vehicle in dependence on the determined distance.

In accordance with an embodiment, the sensor of the autonomous vehicle is accordingly adapted to detect a first code marking arranged adjacent to the lane marking and to determine a first distance between the detected first code marking and the lane marking. The sensor is further adapted to detect a second code marking that is arranged adjacent to the lane marking and that is disposed opposite the first code marking transversely to the lane marking, that is at the other side of the lane marking. Analog to the first code markings, the sensor is adapted to determine a second distance between the detected second code marking and the lane marking. The control device is adapted to control the vehicle in dependence on the determined first distance and on the determined second distance.

The respective position of the first and second code markings relative to the lane marking is used to influence the control of the vehicle—beyond the lane control. In other words, the code marking itself is in principle not the carrier of the information, but rather the distance of the code marking relative to the lane marking. In this manner, a code marking "encodes" a specific piece of information for the vehicle that can be "decoded" by the vehicle to convert the information e.g. into a control command. The distance from the lane marking can be varied such that a specific distance value represents a specific piece of information, in particular a control command for the vehicle. A specific piece of information from an optionally large amount of information can thus in principle already be communicated to the vehicle by a single code marking without a plurality of markings being required for this purpose.

Two oppositely code markings are advantageously detected that can together form a code marking pair. This permits a particularly reliable detection of information that can be even more complex with respect to the case of only one code marking. This will be explained in even more detail further below.

A further advantage of the invention is that the sensor for detecting the lane marking is already frequently suitable per se for detecting distances. For example, the distance between the lane marking and an internal reference can be determined to control the vehicle along the lane marking to hold this distance at a predefined desired value by means of an adaptive regulation. This means that in many cases the vehicle already has the required sensor technology to simply enable the determination of the distance between the lane marking and a respective code marking. The complexity of the vehicle can hereby be kept low since no additional hardware in the form of additional sensors has to be provided. Additional sensors can nevertheless be sensible or necessary in some applications, in particular when an electromagnetic detection system and an optical detection system are to be implemented in a vehicle in combined form.

The sensor or the control device is generally adapted to detect a code marking or to distinguish it from other markings, in particular from the lane marking. The sensor or the control device should equally be adapted to distinguish the lane marking from other markings, in particular from code markings, to ensure a reliable control of the vehicle.

The sensor of the vehicle preferably "expects" that the second code marking is disposed opposite the first code marking transversely to the lane marking, i.e. a respective code marking is located at both sides of the lane marking. In other words, the code markings can be arranged diametrically opposite with respect to the lane marking. The lane marking thus essentially extends centrally between the first and second code markings. In this manner, the code markings are arranged in the direct spatial environment of the lane marking and of one another, which is particularly advantageous with respect to a reliable detection of the relevant markings. The code markings can be arranged here such that they can be easily co-detected by the sensors known in the prior art for the detection of the lane marking. Expensive "wide-angle" sensors or additional sensors can thus be dispensed with. The arrangement transversely to the lane marking also has the advantage that the distances between the code markings and the lane marking can be detected at least substantially simultaneously in time and that a fast and reliable detection of the information is hereby possible. The code markings are preferably arranged on an imaginary straight line that extends substantially perpendicular to the lane marking. However, this does not have to be the case. The code markings can thus also be arranged slightly offset along the lane marking, which then at least does not bring about any disadvantage if both code markings can be detected simultaneously or at least very briefly after one another. A piece of information or an information unit usable for the vehicle and preferably having a maximum of two code markings is encoded with respect to the fast detectability, with a maximum of one code marking being located at each side of the lane marking.

It is understood that features that are described in connection with the embodiment having two code markings can also be implemented in a corresponding manner in a vehicle that is controlled, apart from the lane marking, in dependence on only one measured distance from a code marking. It is further understood that although the invention in accordance with the above description predominantly starts from two measured distances between a respective code marking and the lane marking, it is conceivable in accordance with the general aspect to provide the vehicle with information on the basis of only one distance measurement.

Further advantageous embodiments of the invention are described in the following description, in the claims and in the Figures.

In accordance with a preferred embodiment, the control device is further adapted to determine a value from the first distance and/or from the second distance that represents an unambiguous control command for the vehicle. The combination of two distances permits a large number of different values or control commands to be encoded that can also be implicitly present in the form of an indication on the property of a section of the lane marking adjacent to the code marking. The value can in particular be a numerical value that can be calculated from the two determined distance values. Any combination of two distance values can here correspond to an unambiguous control command. An association between a calculated value and a control command can take place by an association table stored in the vehicle. Alternatively to a calculation of the value from the two distances, a look-up table can also be stored in which the associated value that represents a control command is stored for every combination of distances to be expected. The processing of the distances can be accelerated and can run particularly reliably in this manner. The determination of the control command can also take place in the sensor.

In accordance with a further preferred embodiment, the sensor is furthermore adapted to determine the first distance and/or the second distance as a multiple of a predefined, in particular discrete, increment. A "discrete increment" is to be understood in this connection as a fixed increment that can be counted off and that is defined uniformly for an entire lane. The resolution of the sensor can be adapted to the discrete increment such that the sensor determines the distance in the unit "increments". For this purpose, the resolution accuracy ("resolution increment") of the sensor can preferably amount to half a predefined increment or less so that the distance can be determined reliably and precisely in the unit "increments" (e.g. when the edge decisive for the distance is in the region of a transition between two sensor pixels). In other words, the predefined increment by which a distance grid of a code marking from the lane marking can be defined is preferably at least twice as large as the distance that can be measured, i.e. resolved, by the sensor. The predefined increment can also amount to three times the sensor resolution or can be selected as even larger in the sensor of a still more accurate or more robust measurement. Conversely, with a constant predefined increment, the sensor resolution can also be increased to be able to reliably determine the distance in increments also under unfavorable conditions (e.g. in the case of inexactly applied code markings). The sensor preferably determines the distance as a whole number multiple of the increment. The sensor here can be adapted to round a measured distance to the closest multiple of the (discrete) increment. The sensor can advantageously be configured as a discrete sensor.

The predefined increment can be dimensioned as so large that a respective code marking that has been arranged remote from the lane marking at a distance of an increment can still just be reliably distinguished from the lane marking by the sensor. In other words, the actual or calculated resolution of the sensor and the predefined increment can be matched to one another. The predefined increment can furthermore be dimensioned as so small that the distance between a code marking and the lane marking detectable by the sensor amounts to at least two increments, preferably at least three increments, and particularly preferably at least four increments.

In accordance with a further preferred embodiment, the control device is furthermore adapted to determine whether the first distance and/or the second distance is/are at least substantially equal to a whole number multiple of a predefined discrete increment and to generate an error signal when the first distance and/or the second distance is/are not at least substantially equal to a multiple of the predefined discrete increments. It is assumed here that a valid code marking is always arranged remote from the lane marking by a distance of multiples of the increment. The sensor can therefore check in this manner whether the measured distance is actually a distance between a code marking and the lane marking that should be used for the control of the vehicle. If the measured distance is not equal to a multiple of the predefined discrete increment, it is not a valid measurement—under said assumption that valid code markings are always spaced apart from the lane marking by multiples of the increment. The determined distance that is not based on a code marking, but rather on a different object, under said assumption, can e.g. be discarded or other suitable measures can be taken (e.g. emergency stop of the vehicle). Both distances are preferably checked. In this manner, a respective pair of code markings can be validated, whereby a defective detection of information can be precluded even better.

In accordance with a further embodiment, the control device is furthermore adapted to determine a direction of travel of the vehicle from the first distance and/or from the second distance. For example, the first code marking that is always arranged at the left of the lane marking from the point of view of the vehicle in a forward direction can always be spaced apart further from the lane marking than the second code marking always arranged at the right of the lane marking. It is also conceivable to distinguish the direction of travel only with reference to one distance, namely when a code marking associated with the direction of travel is positioned at a predefined unambiguous distance and always at a specific side of the lane marking (e.g. at the right in the direction of travel). The control device can determine the direction of travel from this.

The sensor is furthermore adapted to detect the first code marking and the second code marking pairwise, with an error signal being generated when the first code marking and the second code marking are not detected pairwise. In this connection, "pairwise" means that the first and second code markings have to be detected at least substantially simultaneously in time. There is otherwise no valid code marking pair that should be taken into account for the control of the vehicle. In the case of a generated error signal, the measurement can be discarded or another suitable measure can be taken, for instance an output of the error signal to a higher ranking control of the vehicle or the setting of an error flag. The pairwise detection also ensures a time-efficient detection of the information encoded by the code marking. The distances, that are likewise preferably determined pairwise are present substantially simultaneously in time so that the information can be decoded immediately. Consistent with this procedure, an error signal can in particular also be generated when the first or second distances are detected separately, i.e. not substantially simultaneously in time.

In accordance with a further embodiment, the control device is furthermore adapted to determine whether the first distance and/or the second distance infringes/infringe at least one distance limit value and to generate an error signal associated with the at least one distance limit value when the at least one distance limit value is infringed. A check can be made in this manner whether individual distance measurements are based on valid code markings or whether both distance measurements are based on a valid code marking pair. Both an upper distance limit value and a lower distance limit value can be defined for this purpose. A lower distance limit value that is greater than zero can be defined, for example. The lower distance limit value can in particular amount to a predefined increment, i.e. the measured distance has to amount to at least one increment. Otherwise an error signal is preferably generated.

The control device can furthermore be adapted to determine whether an absolute difference of the first distance and of the second distance and/or whether a ratio between the first distance and the second distance infringe/infringes a validation limit value and to generate an error signal if the validation limit value is infringed. Individual distance limit values can be dispensed with here and instead a validation of the code marking pair can take place on the basis of the difference or of the ratio between the two distances that only requires a single comparison with a limit value. Provided that e.g. for the above-named distinguishability of the direction of travel, the first distance should always be greater than the second distance, this information can be used to validate a code marking pair. If therefore it is determined by the sensor that the two distances are identical (difference equal to zero; ratio equal to 1), an error is present.

The vehicle preferably only has a single sensor for detecting the lane marking, the first code marking, and the second code marking. The complexity of the vehicle with respect to hardware and software can hereby be particularly low. The processing of a plurality of different sensor signals can in particular be avoided.

In accordance with a further embodiment, the sensor is adapted to determine at least one distance between the lane marking and the vehicle for detecting the lane marking, with the sensor in particular being configured as a distance sensor. The distance sensor can in particular only be configured to measure distances. An image sensor is, however, also conceivable that calculates distances between detected markings from measured image data. It can be sufficient for the detection of a code marking only to determine the distance between the presumed code marking and the vehicle. The distance between the code marking and the lane marking can then be determined by trigonometry on the basis of this distance measurement and a measured distance between the lane marking and the vehicle. The distance thus determined can be evaluated by one or more of the above-explained validation steps to determine whether the measured distance is actually based on a code marking. Alternatively, the determined distance can also be directly processed. This can in particular be considered when it has already been determined otherwise that the measured distance is based on a code marking. Each code marking can, for example, be provided with a signal color that is detected by the sensor or otherwise.

The sensor can comprise an optoelectronic sensor and/or an electromagnetic sensor that can in particular have an inductive sensor, a magnetic field sensor, or a capacitive sensor. It is understood that the code markings can be configured as optically and/or electromagnetically detectable markings in dependence on the sensor type.

The above-described features of the sensor can also be implemented in combination with the control device. The sensor can in particular act solely as a measurement member, with the control device taking over the processing of the sensor signals. Conversely, the sensor can take over signal processing steps wholly or partly.

The invention further relates to a marking arrangement for an autonomous vehicle, in particular an automated guided vehicle, in accordance with one of the above-described embodiments. The marking arrangement comprises a central continuous lane marking, at least one first code marking adjacent to the lane marking and arranged at a first distance from the lane marking as well as at least one second code marking that is adjacent to the lane marking, that is arranged at a second distance from the lane marking, and that is disposed opposite the first code marking transversely to the lane marking. The first code marking and the second code marking here form a code marking pair that represents an unambiguous control command for the vehicle on the basis of the first and second distances.

The first distance is preferably always larger than the second distance in order to define e.g. a direction of travel for the vehicle in this manner. Provision can additionally or alternatively be made that the first distance and the second distance are each equal to a multiple of a predefined discrete increment that can correspond to the increment explained in connection with the vehicle. The increment can in particular be equal to a lane width of the lane marking, i.e. the predefined discrete increment can be at least substantially equal to the width of the lane marking. The sensor can hereby have a low complexity, with the processing of the sensor signals being particularly simple from a technical programming viewpoint. However, the control precision of the vehicle is not hereby reduced in combination with the marking arrangement.

It is further preferred that the first code marking and/or the second code marking does/do not have any interruption, i.e. a respective code marking is configured as a unit contiguous in itself that is, for instance, not composed of a plurality of code elements (e.g. a dashed line or a barcode line). A code marking can, for example, be formed as a continuous areal section that has a negligible size relative to the length of the lane marking and can thus be detected directly as a whole by the sensor when the vehicle has adopted a specific position relative to the code marking, i.e. the vehicle does not have to cover any path distance or at least any significant path distance to detect the code marking or the code markings.

An outer dimension (e.g. length, width, or diameter) of the first code marking and/or an outer dimension of the second code marking is/are preferably substantially equal to the width of the lane marking. A single sensor can hereby advantageously be provided for detecting all the relevant markings, said sensor e.g. being able to be adapted to the width of the lane marking. A reliable detection of the code markings is furthermore promoted. The outer dimension, in particular all the outer dimensions, of the first and/or second code markings can furthermore be limited to the width of the lane marking so that the code markings can be called small overall. A respective code marking can thus be detected very fast without the vehicle having to cover a significant path section or any path section at all to detect the code marking as a whole.

The first code marking and the second code marking are preferably of the same type, in particular identical. A respective code marking is furthermore singular or individualized and is not continuous. The code marking can, for example, be of strip shape or rectangular.

The invention furthermore relates to a system having at least one autonomous vehicle in accordance with any one of the above-described embodiments and to at least one marking arrangement in accordance with any one of the above-described embodiments.

BRIEF DESCRIPTION OF THE DRAWINGS

The invention will be explained in the following purely by way of example with reference to the schematic drawings, in which.

DETAILED DESCRIPTION

In the following and in the Figures, similar parts are marked by the same reference numerals.

Figure 1:
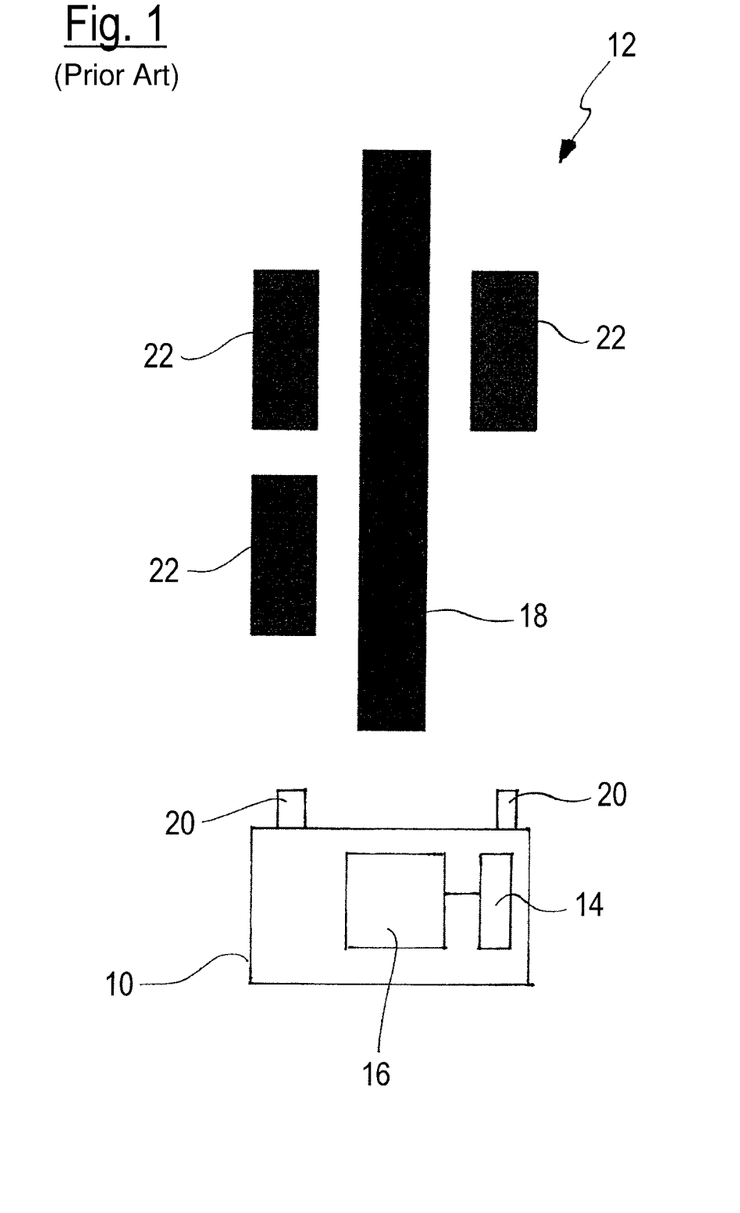
FIG. 1 shows an autonomous vehicle of the prior art with a marking arrangement of the prior art.

FIG. 1 schematically shows an autonomous vehicle 10 having a marking arrangement 12 of the prior art. The vehicle 10 has a control device 14 and a sensor 16 for detecting a continuous lane marking 18 of the marking arrangement 12. The control device 14 is adapted to control the vehicle 10 along the lane marking 18 in dependence on the detected lane marking 18. The vehicle 10 has further sensors 20 for detecting markings 22 that are arranged adjacent to the lane marking 18 and that together or separately represent a control command for the vehicle 10. To detect this control command on the basis of the markings 22, the vehicle 10 has to cover the length along the lane marking 18 specified by the markings 22. The individual markings 22 are here detected as such and are evaluated by the control device 14. The more complex the information that is to be communicated to the vehicle 10 by the markings, the more markings 22 have to be provided along the lane marking 14. The path distance that the vehicle 10 has to cover to detect the corresponding information is hereby extended.

Figure 2:
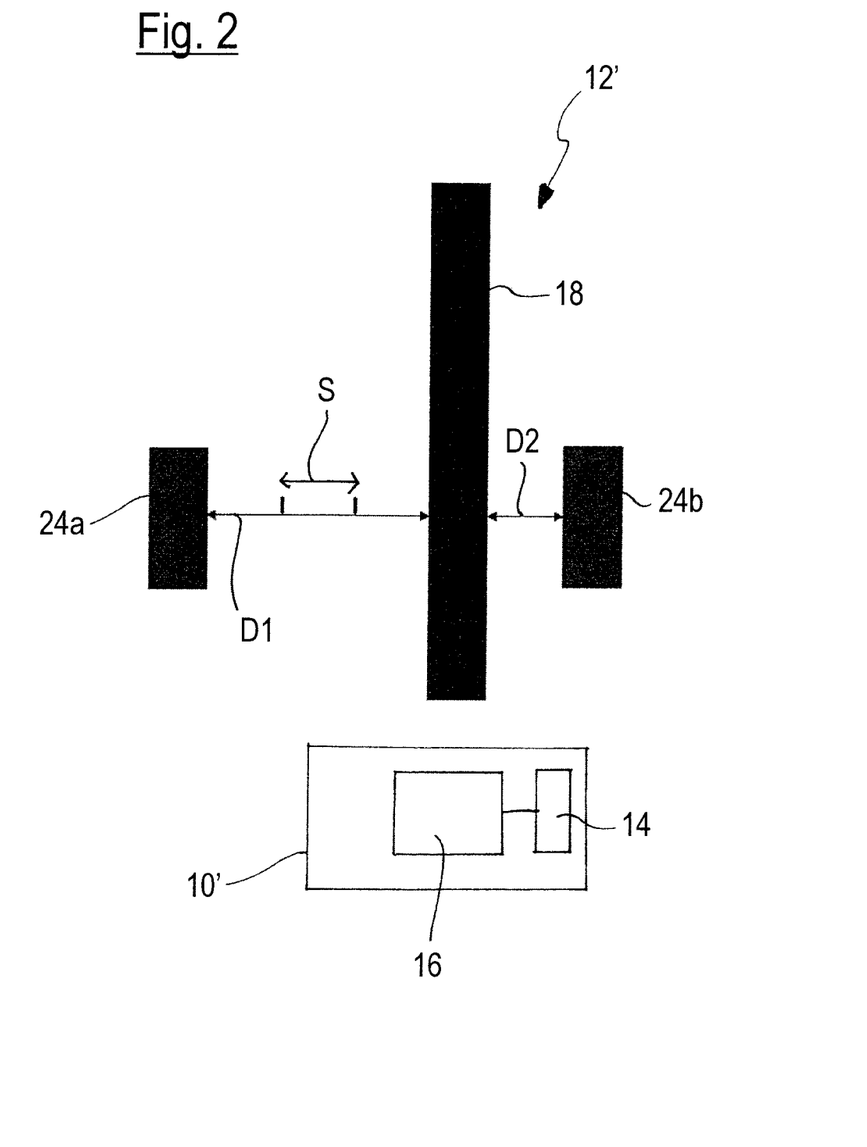
FIG. 2 shows an autonomous vehicle in accordance with the invention with a marking arrangement in accordance with the invention.

An autonomous vehicle 10' having a marking arrangement 12' in accordance with the invention is shown in FIG. 2. Differing from the vehicle 10 of FIG. 1, the vehicle 10' of this embodiment does not have any additional sensors 20. The sensor 16 is rather adapted to detect a first code marking 24a arranged adjacent to the lane marking 18 and to determine a first distance D1 between the detected first code marking 24a and the lane marking 18, with the sensor 16 furthermore being adapted to detect a second code marking 24b that is arranged adjacent to the lane marking 18 and that is disposed opposite the first code marking 24a transversely to the lane marking 18 and to determine a second distance D2 between the detected code marking 24b and the lane marking 18. The control device 14 is furthermore adapted to control the vehicle 10 in dependence on the determined first distance D1 and on the determined second distance D2. The code markings 24a and 24b preferably form a common code marking pair that represents an unambiguous control command for the vehicle 10'. The oppositely disposed arrangement of the code markings 24a and 24b transversely to direction of extent of the lane marking 18 enables a detection of the code markings 24a and 24b substantially simultaneously in time without the vehicle 10' having to cover a relevant path distance along the lane marking 18 for this purpose.

The vehicles 10 and 10' are shown purely schematically. The size ratio between the vehicles 10 and 10' and the marking arrangements 12 and 12' can thus be completely different than in the Figures.

The distances D1 and D2 preferably each amount to a multiple of a predefined discrete increment S. In FIG. 2, the first distance D1 amounts to three increments S and the second distance D2 amounts to one increment S. It is possible to arrange further code marking pairs 24a, 24b along the lane marking 18 that are each detected and processed separately from other code marking pairs 24a, 24b. It has proven advantageous for the detection of a respective code marking 24a, 24b or of a code marking pair 24a, 24b to select the width of the code markings 24a, 24b equal to the width of the lane marking 18 (outer dimension transversely to the direction of extent of the lane marking 18), as is shown in FIG. 2. Matched to this, the increment S can also be equal to the width of the lane marking 18 and/or equal to the width of the respective code markings 24a, 24b. The length of the code markings 24a, 24b respectively amounts to two increments S in FIG. 2. However, this does not have to be the case. The code markings 24a, 24b can thus e.g. also be quadratic with the increment S as the edge length. With respect to a detectability of the code markings 24a, 24b that is as rapid as possible, relatively small code markings 24a, 24b have proven favorable that can, however, still be reliably detected. The code markings 24a, 24b preferably have no interruptions. A respective code marking 24a, 24 can thus, for instance, be formed as a contiguous surface section as is indicated in FIG. 2. Relatively small code markings 24a, 24b can thus also be reliably detected with a moderate sensor resolution.

Exactly one code marking pair 24a, 24b that preferably comprises no more than two oppositely disposed code markings 24a and 24b is preferably provided for encoding a respective control command for the vehicle 10'. The control device 14 is preferably adapted for this purpose to determine a value from the first distance D1 and from the second distance D2 that represents a control command, in particular an unambiguous control command, for the vehicle 10. The following encoding scheme K1 can be used, by way of example:

| D1 [S] | D2 [S] | Value |
|---|---|---|
| 0 | 0 | 0 |
| 1 | 0 | 1 |
| 2 | 0 | 2 |
| 2 | 1 | 3 |
| 3 | 0 | 3 |
| 3 | 1 | 4 |
| 3 | 2 | 5 |
| 0 | 1 | -1 |
| 0 | 2 | -2 |
| 1 | 2 | -3 |
| 0 | 3 | -3 |
| 1 | 3 | -4 |
| 2 | 3 | -5 |

It is understood that the distances D1, D2 can also amount to more than three increments S and can be correspondingly encoded. However, this does not have to be the case. In the above case, the value is respectively the sum of the two distances. A negative value is detected when the vehicle 10' travels in the opposite direction and when the sensor 16 sees the code markings 24a, 24b "swapped over". The above encoding scheme has the property that different distance combinations can result in the same value. The pairs (D1, D2)=(2, 1) and (D1, D2)=(3, 0) thus each result in a value 3, which does not, however, have to signify a disadvantage in every case. The encoding scheme thus has the advantage that the underlying concept is intuitively understandable and that control commands can easily be encoded by corresponding code markings, in particular by trained personnel in a short time.

A different encoding scheme K2 can be defined as follows, for example:

| D1 [S] | D2 [S] | Value |
|---|---|---|
| 0 | 0 | 0 |
| 1 | 0 | 1 |
| 2 | 0 | 2 |
| 2 | 1 | 3 |
| 3 | 0 | 4 |
| 3 | 1 | 5 |
| 3 | 2 | 6 |
| 4 | 0 | 7 |
| 4 | 1 | 8 |
| 4 | 2 | 9 |
| 4 | 3 | 10 |
| 0 | 1 | -1 |
| 0 | 2 | -2 |
| 1 | 2 | -3 |
| 0 | 3 | -4 |
| 1 | 3 | -5 |
| 2 | 3 | -6 |
| 0 | 4 | -7 |
| 1 | 4 | -8 |
| 2 | 4 | -9 |
| 3 | 4 | -10 |

It is understood that the distances can also amount to more than four increments S in the case of the above-shown encoding scheme and can be encoded in a corresponding manner. Analog to the encoding scheme K1, the distance D1 in the forward direction in which positive values always result, with the exception of the case of zero, can always be greater than the second distance D2. The vehicle 10 can hereby detect a defined direction of travel, e.g. "the" forward direction. In the converse case (vehicle 10 travels opposite to the defined direction of travel), the sensor 16 in turn sees the code markings 24a, 24b swapped over so that the measured distances D1 and D2 are also swapped over. The encoding scheme K2 has the advantage that a respective distance pair (D1, D2) exclusively corresponds to a specific value that represents an unambiguous control command in this manner. In this respect, an unambiguous association between a distance pair (D1, D2) and a control command can be ensured. The "field of view" of the sensor 16 is furthermore ideally utilized, with the code markings 24a, 24b not being arranged further away than necessary.

The code markings 24a, 24b can e.g. be simply arranged or applied at a desired distance D1 or D2 from the lane marking by means of a template (not shown) grated to the desired increment S.

It is understood that the more values that can be encoded, the smaller the increment S is that is resolved by the sensor 16. The number of encodable values can furthermore also be increased by the increase of the distance D1, D2 measurable as a maximum by the sensor 16. This can take place by a "wide angle capable" sensor 16 that can also detect code markings 24a, 24b further remote from the lane marking 18. It is further understood that other encoding rules than the ones listed here can also be used. One of a plurality of predefined encoding schemes can in particular be selected by a user or automatically so that the vehicle 10' is compatible with different marking arrangements 12'. A plurality of encoding schemes K1, K2 can be stored in the vehicle 10' for this purpose.

Corresponding encoding schemes can also be used or adapted in an analog manner for the case in which only a single distance value is to be associated with a specific control command and in particular when code markings whose distance is evaluated are provided only at one side. The vehicle can hereby have a particularly low complexity, which is in particular of advantage for those application cases in which a particularly robust and/or inexpensive technology is sought.

REFERENCE NUMERAL LIST 10, 10' vehicle
12, 12' marking arrangement
14 control device
16 sensor
18 lane marking
20 sensor
22 marking
24a first code marking
24b second code marking
D1 first distance
D2 second distance
S increment

The invention claimed is:

1. A marking arrangement for an autonomous vehicle, the autonomous vehicle comprising a control device and a sensor for detecting a continuous lane marking,
   wherein the control device is adapted to control the vehicle along the lane marking in dependence on the detected lane marking;
   wherein the sensor is adapted to detect a first code marking arranged adjacent to the lane marking;
   wherein the sensor is further adapted to determine a first distance between the detected first code marking and the lane marking;
   wherein the control device is further adapted to control the vehicle in dependence on the determined first distance, wherein the marking arrangement comprises:
      the continuous lane marking,
      the at least one first code marking arranged adjacent to the lane marking and at a first spacing from the continuous lane marking; and
      at least one second code marking that is arranged adjacent to the continuous lane marking and at a second spacing from the continuous lane marking and that is disposed opposite the first code marking transversely to the continuous lane marking and
   wherein the control device is furthermore adapted to control the vehicle in dependence on the determined first distance and a second distance determined between the second code marking and the lane marking,
   wherein the first distance is greater than the second distance;
   and wherein the first code marking and the second code marking form a code marking pair that represents an unambiguous control command for the vehicle on the basis of the first distance and the second distance.

2. The marking arrangement in accordance with claim 1, wherein the first distance and the second distance are equal to a multiple of a predefined discrete increment.

3. The marking arrangement in accordance with claim 1, wherein at least one of the first code marking and the second code marking does not have any interruption.

4. The marking arrangement in accordance with claim 1, wherein an outer dimension of at least one of the first code marking and of the second code marking is substantially equal to the width of the lane marking.

5. An autonomous vehicle, controlled responsive to the marking arrangement of claim 1.

6. The autonomous vehicle in accordance with claim 5, wherein the autonomous vehicle is an automated guided vehicle.

7. The autonomous vehicle in accordance with claim 5, wherein the control device is further adapted to determine a value from the first distance and from the second distance that represents the unambiguous control command for the vehicle.

8. The autonomous vehicle in accordance with claim 5, wherein the sensor is further adapted to determine at least one of the first distance and the second distance as a multiple of a predefined discrete increment.

9. The autonomous vehicle in accordance with claim 5, wherein the control device is further adapted
   to determine whether at least one of the first distance and the second distance is at least substantially equal to a whole number multiple of a predefined discrete increment; and
   to generate an error signal when at least one of the first distance and the second distance is not at least substantially equal to a multiple of the predetermined discrete increment.

10. The autonomous vehicle in accordance with claim 5, wherein the control device is further adapted to determine a direction of travel of the vehicle from at least one of the first distance and the second distance.

11. The autonomous vehicle in accordance with claim 5, wherein the sensor is further adapted
   to detect the first code marking and the second code marking pairwise; and
   to generate an error signal when the first code marking and the second code marking are not detected pairwise.

12. The autonomous vehicle in accordance with claim 5, wherein the control device is further adapted
   to determine whether at least one of the first distance and the second distance infringes at least one distance limit value; and
   to generate an error signal associated with the at least one distance limit value when the at least one distance limit value is infringed.

13. The autonomous vehicle in accordance with claim 5, wherein the control device is further adapted
   to determine whether an absolute difference of the first distance and of the second distance and/or a ratio between the first distance and the second distance infringes/infringe a validation limit value; and
   to generate an error signal when the validation limit value is infringed.

14. The autonomous vehicle in accordance with claim 5, wherein the vehicle has only one single sensor for detecting the lane marking, the first code marking, and the second code marking.

15. The autonomous vehicle in accordance with claim 5, wherein the sensor is adapted to determine at least one distance between the lane marking and the vehicle for detecting the lane marking.

16. The autonomous vehicle in accordance with claim 15, wherein the sensor is configured as a distance sensor.

17. The autonomous vehicle in accordance with claim 5, wherein the sensor comprises an optoelectronic sensor and/or an electromagnetic sensor.

18. The autonomous vehicle in accordance with claim 17, wherein the sensor is selected from the group of sensors consisting of an inductive sensor, a magnetic field sensor, and a capacitive sensor.

\* \* \* \* \*